(12) United States Patent
Pomaranski et al.

(10) Patent No.: US 7,228,460 B2
(45) Date of Patent: Jun. 5, 2007

(54) MULTI-STATE STATUS REPORTING FOR HIGH-AVAILABILITY CLUSTER NODES

(75) Inventors: Ken Gary Pomaranski, Roseville, CA (US); Andrew Harvey Barr, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 390 days.

(21) Appl. No.: 10/764,198

(22) Filed: Jan. 23, 2004

(65) Prior Publication Data

US 2005/0188265 A1 Aug. 25, 2005

(51) Int. Cl.
G06F 11/00 (2006.01)

(52) U.S. Cl. .......................... 714/43; 714/56
(58) Field of Classification Search ................ 714/56
See application file for complete search history.

(56) References Cited

U.S. PATENT DOCUMENTS

| | | | |
|---|---|---|---|
| 4,503,534 A | | 3/1985 | Budde et al. |
| 4,503,535 A | | 3/1985 | Budde et al. |
| 5,758,077 A | | 5/1998 | Danahy et al. |
| 6,072,857 A | * | 6/2000 | Venkateshwaran et al. ..... 379/9 |
| 6,304,546 B1 | * | 10/2001 | Natarajan et al. ........... 370/216 |
| 6,389,550 B1 | * | 5/2002 | Carter ........................... 714/1 |
| 6,389,551 B1 | | 5/2002 | Yount |
| 6,536,000 B1 | * | 3/2003 | Jackson et al. ............... 714/57 |
| 6,609,213 B1 | | 8/2003 | Nguyen et al. |
| 6,654,801 B2 | * | 11/2003 | Mann et al. ................ 709/224 |
| 6,694,455 B1 | * | 2/2004 | Scrandis et al. .............. 714/31 |
| 6,725,401 B1 | * | 4/2004 | Lindhorst-Ko ................ 714/47 |
| 6,738,811 B1 | * | 5/2004 | Liang ........................ 709/224 |
| 6,880,100 B2 | * | 4/2005 | Mora et al. ..................... 714/4 |

FOREIGN PATENT DOCUMENTS

| | | |
|---|---|---|
| DE | 10155486 A1 | 5/2003 |
| DE | 10155488 A1 | 5/2003 |
| EP | 0510822 A2 | 10/1992 |
| EP | 0518022 A3 | 11/1996 |
| GB | 2062314 A | 5/1981 |
| JP | 9116564 A | 5/1997 |

OTHER PUBLICATIONS

Microsoft Computer Dictionary, Fifth Edition, 2002, Microsoft Press.*
Patents Act 1977: Search Report under Section 17 for Application No. GB0501121.8.

* cited by examiner

*Primary Examiner*—Scott Baderman
*Assistant Examiner*—Joshua Lohn

(57) ABSTRACT

One embodiment disclosed relates to a node system of a high-availability cluster. The node system includes at least a first register and an output port. The first register stores multi-state status data of the node, and the output port sends signals representing this multi-state status data. The multi-state status data includes at least one degraded state. The node system may also include a second register and an input port. The input port receives signals representing the multi-state status data of another node. The second stores this multi-state status data from the other node. Another embodiment disclosed relates to a method of status reporting for a node of a cluster. A set of rules is applied to determine current multi-state status of the node. The states of the multi-state status including a good state, a bad state, and at least one degraded state.

9 Claims, 2 Drawing Sheets

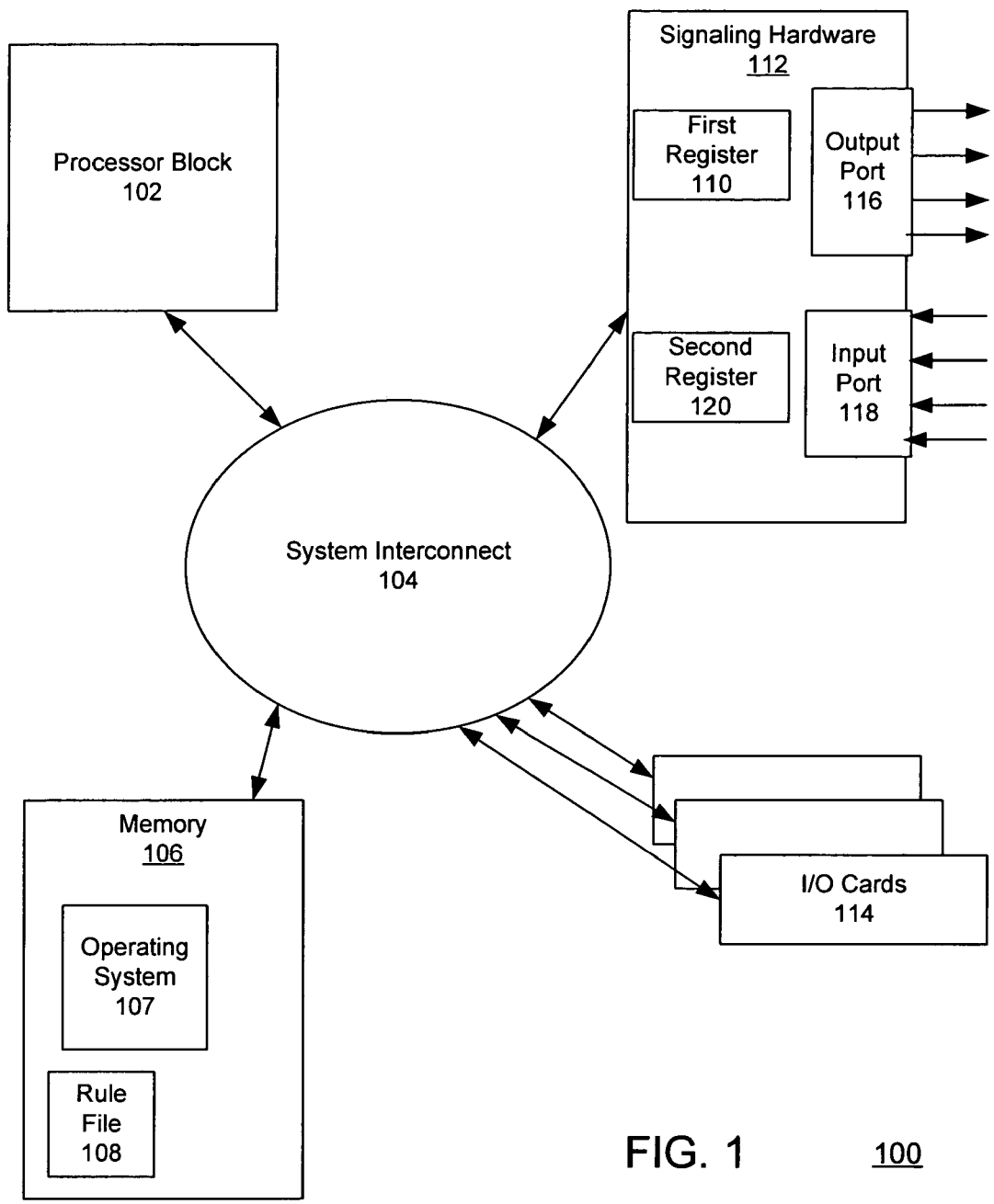
FIG. 1    100

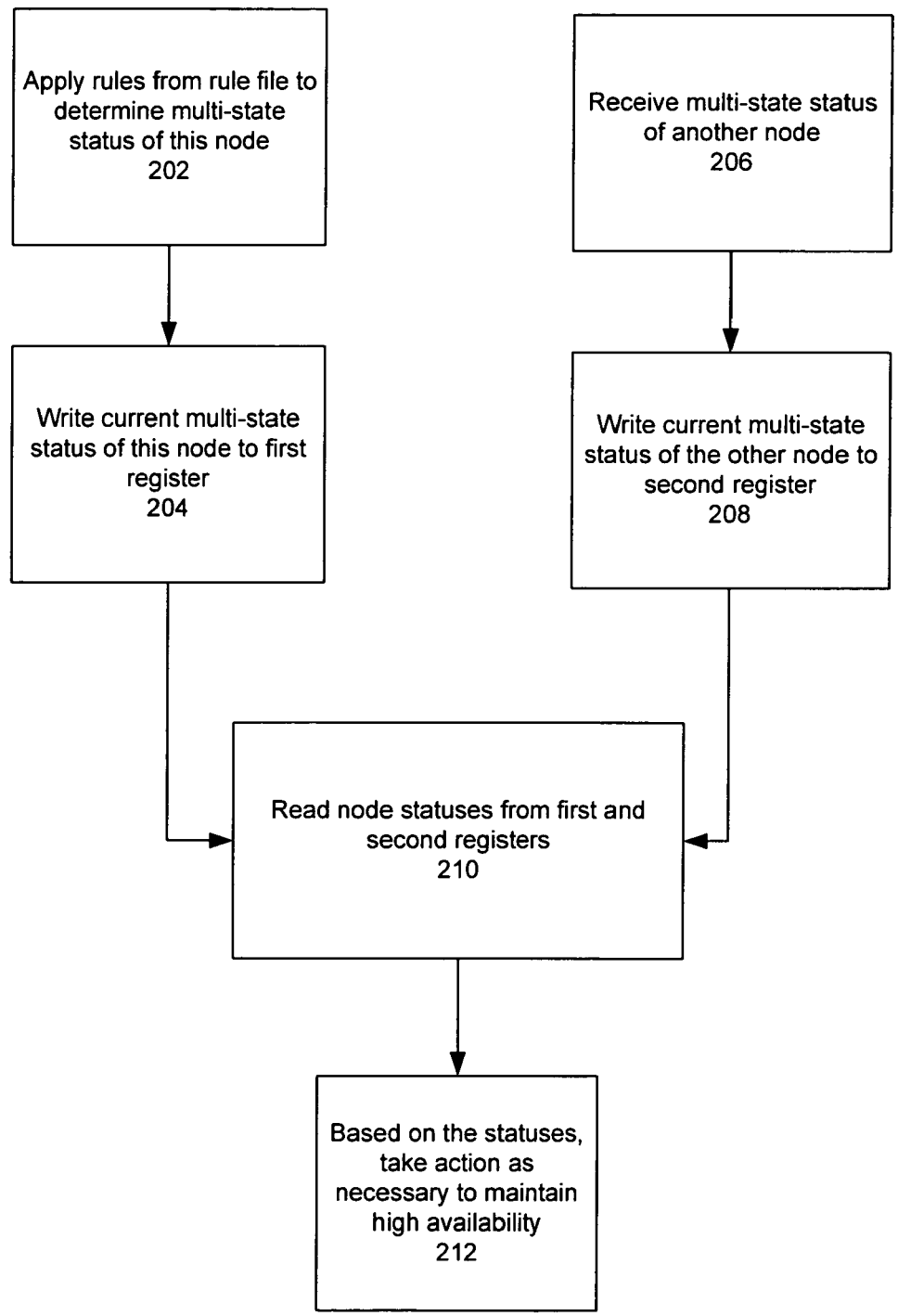
FIG. 2     200

MULTI-STATE STATUS REPORTING FOR HIGH-AVAILABILITY CLUSTER NODES

BACKGROUND OF THE INVENTION

1. Field of the Invention

The present disclosure relates generally to computer networks. More particularly, the present disclosure relates to clusters of interconnected computer systems.

2. Description of the Background Art

A cluster is a parallel or distributed system that comprises a collection of interconnected computer systems or servers that is used as a single, unified computing unit. Members of a cluster are referred to as nodes or systems. The cluster service is the collection of software on each node that manages cluster-related activity. The cluster service sees all resources as identical objects. Resource may include physical hardware devices, such as disk drives and network cards, or logical items, such as logical disk volumes, TCP/IP addresses, entire applications and databases, among other examples. A group is a collection of resources to be managed as a single unit. Generally, a group contains all of the components that are necessary for running a specific application and allowing a user to connect to the service provided by the application. Operations performed on a group typically affect all resources contained within that group. By coupling two or more servers together, clustering increases the system availability, performance, and capacity for network systems and applications.

Clustering may be used for parallel processing or parallel computing to simultaneously use two or more CPUs to execute an application or program. Clustering is a popular strategy for implementing parallel processing applications because it allows system administrators to leverage already existing computers and workstations. Because it is difficult to predict the number of requests that will be issued to a networked server, clustering is also useful for load balancing to distribute processing and communications activity evenly across a network system so that no single server is overwhelmed. If one server is running the risk of being swamped, requests may be forwarded to another clustered server with greater capacity. For example, busy Web sites may employ two or more clustered Web servers in order to employ a load balancing scheme. Clustering also provides for increased scalability by allowing new components to be added as the system load increases. In addition, clustering simplifies the management of groups of systems and their applications by allowing the system administrator to manage an entire group as a single system. Clustering may also be used to increase the fault tolerance of a network system. If one server suffers an unexpected software or hardware failure, another clustered server may assume the operations of the failed server. Thus, if any hardware of software component in the system fails, the user might experience a performance penalty, but will not lose access to the service.

Current cluster services include Microsoft Cluster Server (MSCS), designed by Microsoft Corporation for clustering for its Windows NT 4.0 and Windows 2000 Advanced Server operating systems, and Novell Netware Cluster Services (NWCS), among other examples. For instance, MSCS supports the clustering of two NT servers to provide a single highly available server.

Clustering may also be implemented in computer networks utilizing storage area networks (SAN) and similar networking environments. SAN networks allow storage systems to be shared among multiple clusters and/or servers. The storage devices in a SAN may be structured, for example, in a RAID configuration.

In order to detect system failures, clustered nodes may use a heartbeat mechanism to monitor the health of each other. A heartbeat is a signal that is sent by one clustered node to another clustered node. Heartbeat signals are typically sent over an Ethernet or similar network, where the network is also utilized for other purposes.

Failure of a node is detected when an expected heartbeat signal is not received from the node. In the event of failure of a node, the clustering software may, for example, transfer the entire resource group of the failed node to another node. A client application affected by the failure may detect the failure in the session and reconnect in the same manner as the original connection.

If a heartbeat signal is received from a node of the cluster, then that node is normally defined to be in an "up" state. In the up state, the node is presumed to be operating properly. On the other hand, if the heartbeat signal is no longer received from a node, then that node is normally defined to be in a "down" state. In the down state, the node is presumed to have failed.

SUMMARY

One embodiment of the invention pertains to a node system of a high-availability cluster. The node system includes at least a first register and an output port. The first register stores multi-state status data of the node, and the output port sends signals representing this multi-state status data. The multi-state status data includes at least one degraded state. The node system may also include a second register and an input port. The input port receives signals representing the multi-state status data of another node. The second stores this multi-state status data from the other node.

Another embodiment of the invention pertains to a method of status reporting for a node of a cluster. A set of rules is applied to determine current multi-state status of the node. The states of the multi-state status including a good state, a bad state, and at least one degraded state.

Another embodiment of the invention pertains to an apparatus for reporting status from a node of a cluster. The apparatus includes at least a processor, memory, system interconnect, a software module, and signaling hardware. The processor executes instructions, the memory holds data, and the system interconnect provides intercommunication between components of the apparatus. The software module is configured to apply a set of rules to determine current multi-state status of the node. The multi-state status of the node is output by the signaling hardware. States of the multi-state status includes a good state, a bad state, and at least one degraded state.

BRIEF DESCRIPTION OF THE DRAWINGS

FIG. 1 depicts a representative system at a node of an HA cluster in accordance with one embodiment of the invention.

FIG. 2 is a flow chart depicting a method of multi-state status reporting for high-availability clusters in accordance with an embodiment of the invention.

DETAILED DESCRIPTION

The conventional technique for reporting a state of a clustered node is described above. In the conventional technique, a heartbeat mechanism is used, and the node determined to be in either an "up" or a "down" state.

This conventional technique is insufficient and disadvantageous in various cases. For example, even if a target critical application is not functioning (i.e. the application is down), the node on which the application is running may still be transmitting its heartbeat signals. In that case, the cluster would still consider the node to be up, even though the critical application is down. In another example, the cluster may not receive an expected heartbeat signal from a node and so assume that the node is down. However, that node may actually be up (i.e. operating properly), and the missed heartbeat signal may instead be due to a failed interconnect.

Furthermore, the conventional technique typically utilizes existing circuitry to generate and transmit the status signals. This existing circuitry is also used for other communications within the cluster. In contrast, applicants have determined that using dedicated circuitry specifically designed to robustly generate and transmit status signals is advantageous over the conventional technique.

The efficiency (percentage uptime) of a high-availability (HA) cluster is largely determined by the amount of time the cluster takes to recognize that one of its nodes has ceased performing useful computing or storage functions (i.e. when the node is effectively down). Once the cluster has determined that the node is effectively down, the clustering software can perform the necessary tasks to keep the rest of the nodes running with little interruption to user tasks. The efficiency can also be limited by the number of unnecessary switchovers in an HA cluster, as each switchover event 'costs' some cluster-level uptime. Finally, the 'split-brain' situation should be avoided for an HA cluster to perform correctly. 'Split brain' is the situation (known by those skilled in the art) that results when a node that is thought to be 'down' really is not 'down'. Such a situation can result in data loss and/or failure of an HA cluster. Accuracy in node state determination is key to assuring that 'split brain' does not occur in an HA cluster.

However, as discussed above, the conventional technique used to determine the state of a cluster node is inaccurate in various cases. The conventional technique may result in either false (unnecessary) failovers, or in failed detects. Failed detects are where the cluster level software fails to switchover from a bad node to a good node when it should. Furthermore, the conventional technique often takes an undesirably long time to detect the correct state of a node. For example, for conventional techniques, a suspected failure is double checked using some slow out-of-band method, typically by a query to a $3^{rd}$ party entity, like a shared disk.

An embodiment of the present invention relates to a mechanism for the cluster system to predict, in advance, when a node failure is more likely to occur. Such a predictive mechanism enables the cluster level software to pro-actively eliminate weak nodes from the cluster before those nodes actually go down.

In accordance with one embodiment of the present invention, a multi-state status reporting signal with at least three states is used, instead of the conventional binary reporting signal where the heartbeat signal is either present (up) or not (down). The expansion of the reported state from a simple binary signal to a multi-state (three-state or more) signal advantageously allows for significant improvement in the efficiency (uptime) of an HA cluster. In addition, a fault tolerant path for the communication of the multi-state status from a node is provided.

Advantageously, the present disclosure enables the monitoring inputs on the cluster nodes to more accurately determine what is occurring on an adjacent node in the cluster. For example, degraded states are identified and distinguished from simple "up" states. As another example, node failures and interconnect failures are made distinguishable.

FIG. 1 depicts a representative system 100 at a node of an HA cluster in accordance with one embodiment of the invention. The system 100 includes a processor block 102, system interconnect 104, main memory 106, rule file 108, signaling hardware 112 (including a first register 110, an output port 116, a second register 120, and an input port 118), and other input/output cards 114. Various other components may also be included in the node, such as, for example, disk-based storage and so on. While FIG. 1 shows typical components and a generalized configuration of such a cluster node, the details of such a node will vary according to the implementation.

The processing block 102 includes one or more central processing units (CPUs). The processing block 102 also includes corresponding memory caches for those CPUs.

The system interconnect 104 comprises a communications system that interconnects the various components of the system 100. The system interconnect 104 may include, for example, multiple communications buses.

The main memory system 106 is utilized by the node in performing its processing functions. The main memory 106 typically comprises dynamic random access memory (DRAM) components, but may also include other forms of memory. The main memory 106 may store the operating system 107 for the node, among other software components.

The rule file 108 comprises a configuration file of node status rules. These rules are used by the operating system 107 in determining the status of the node. In other words, this file keeps the rules that the operating system 107 applies to make decisions as to what it should write into the first register 110. As depicted, the rule file 108 may be held in memory 106, but in other embodiments, these rules may reside elsewhere within the memory space of the node.

The signaling hardware 112 includes electronic circuitry configured to store and signal the current state of this node to a next node in the cluster. In one embodiment, this circuitry may be implemented as the first register 110 and the output port 116. The signaling hardware 112 further includes electronic circuitry configured to receive and hold the state of an adjacent node in the cluster. In one embodiment, this circuitry may be implemented as the input port 118 and the second register 120.

The first register 110 includes multiple bits representing the state or status of the node. In one embodiment, the first register 110 includes a first bit representing "good" or "bad" status and a second bit that acts as a flag indicative of a "degraded" or "not_degraded" status. These two bits may represent three states (good/degraded/bad) as follows. If the first bit indicates good, and the second bit indicates not degraded, then the state of the node is taken to be good. If the first bit indicates good, and the second bit indicates degraded, then state of the node is taken to be degraded. Finally, if the first bit indicates bad, then the state of the node is taken to be bad (no matter the indication of the second bit). The bits in the first register 110 may be written by the operating system (or operating system application) using the rules in the rule file 108.

The output port 116 is configured to send signals to a next cluster node. The signals sent include those indicative of the multi-state status of the node. In addition, the output port 116 may have lines for power and ground. The multi-state status signals may include, for example, a good/bad signal and a degraded/not_degraded signal which are indicative of the state of the corresponding bits in the first register.

The second register 120 includes multiple bits representing the state or status of another cluster node. Like the first register 110, the second register 120 includes, in one embodiment, a first bit representing "good" or "bad" status and a second bit that acts as a flag indicative of a "degraded" or "not_degraded" status. These two bits may represent three states (good/degraded/bad) for the other cluster node.

The input port 118 is configured to receive signals from the other cluster node. The signals include those indicative of the multi-state status of the other node. In addition, the input port 118 may have lines for power and ground. For example, the multi-state status signals may include a good/bad signal and a degraded/not_degraded signal. The signal values may be held in corresponding bits of the second register to represent the multi-state status of the other node.

In an alternative embodiment, multiple levels of degradation (instead of a single degraded state) may be represented. The levels of degradation may be represented by additional bits in the first register 110 and in the second register 120, may be transmitted using additional lines in the output port 116, and may be received using additional lines in the input port 118.

The other input/output cards 114 are also included on the node. These I/O cards 114 may be used, for example, to receive input needed by the node to perform its functions, or to output the results of processing by this node.

FIG. 2 is a flow chart depicting a method 200 of multi-state status reporting for high-availability clusters in accordance with an embodiment of the invention. The method 200 includes steps to determine and use the multi-state status of the nodes in order to maintain a high-availability of the cluster.

As described above, the system 100 has a set of rules that is stored in a rule file 108 that is accessible by the operating system 107. These rules are applied 202 by the operating system, or an operating system application, to determine the multi-state status of this node.

In one embodiment, the possible states include GOOD, BAD and DEGRADED states. The rule set in the configuration file 108 has rules that define each of these states. A GOOD state may be defined as when the node is running up to par in all aspects. For example, the GOOD state may require all of the following rules to be satisfied.

Rule G1: application reports "up" status
Rule G2: operating system reports "up" status
Rule G3: no critical chassis-codes received Variations of these rules and additional rules may also be used to define a GOOD state depending on the specific system. A BAD state may be defined as when a critical aspect is not operating properly such that the node is effectively down. For example, the BAD state may require any of the following rules to be satisfied.

Rule B1: application reports "down" status
Rule B2: operating system reports "down" status Rule B3: critical chassis-codes received Variations of these rules and additional rules may also be used to define a BAD state depending on the specific system. A DEGRADED state may be defined as when one or more aspects of the node is not running "up to par," so that the node may possibly be removed from the HA cluster.

Rule D1: System loses greater than 50% performance
Rule D2: severe (one level below critical) chassis code received Variations of these rules and additional rules may also be used to define a DEGRADED state depending on the specific system. For example, the percentage performance prior to a degraded state being entered may differ from 50%. It may be higher, such as 75%, or lower, such as 25%.

In one embodiment, the DEGRADED state could be a simple flag indicating that the node is either degraded or not. In other embodiments, there may be multiple levels of degradation. These multiple levels of degradation may be implemented using multi-bit encoding of the level of degradation. In other words, instead of having just a single DEGRADED state, multiple levels of degradation may be defined by the rules. Using multiple levels of degradation would advantageously provide the HA clustering software with additional information for its decision making process as to how to manage the nodes of the cluster. For example, the degradation level may depend on the percentage performance lost (with the more performance lost, the worse the degradation level).

The operating system 107 writes 204 the current state of the system for this node to the first register 110 in the signaling hardware 112. The signaling hardware drives 205, via the output port 116, the current state information from the first register 110 to a next node in the cluster for processing by that node.

Meanwhile, the multi-state status of another node in the cluster is received 206 by this node. This status may be received via the input port 118 and written 208 by the signaling hardware 112 into the second register 120. In one embodiment, the possible states from the input from the other node include GOOD, BAD, DEGRADED, and NO SIGNAL states. The NO SIGNAL state may be defined as the state when there are unrecognized inputs coming from the other node.

The statuses of this node and the other node are periodically read 210 from the first and second registers, respectively. Based on the node status data, action may be taken 212, as necessary, to maintain high-availability of the cluster. For example, a bad or degraded node may be swapped out of the cluster. The action to be taken is determined by the cluster-level algorithms. The specific algorithms used are implementation dependent.

The system and method described above includes various advantages over the conventional technique. First, the multi-state (more than binary state) node status data provides more accurate state information of the node. This gives upper level clustering software more information for its determination of whether a node removal (or addition) is necessary. Second, the hybrid hardware/software mechanism described above is designed specifically for this purpose, resulting in significantly fewer false (or failed) node switchovers.

Third, the problematic situation of software being down, but hardware continuing to send a heartbeat signal, is avoided. Fourth, a means is provided to differentiate between a heartbeat signal lost in a broken interconnect and a heartbeat signal lost due to a down system.

Fifth, a mechanism for predictive maintenance of the cluster is provided. The conventional technique does not send a predictive message to the remaining nodes in the cluster. The degraded state (or multiple degraded levels) described above allows the HA cluster software to proactively remove a node before it fails, resulting in increased cluster uptime.

As described above, each node of the cluster may use signaling hardware to communicate its status to a next node in the HA cluster. The specific configuration for the inter-connection of the hardware between two nodes is implementation dependent. However, in one embodiment, the inter-connection between two nodes may comprise a dedicated, point-to-point communication path to advantageously facilitate the rapid communication of status data between nodes.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of status reporting for a computer system configured as a node of a cluster of interconnected computer systems that is used as a single computing unit, the method comprising applying a set of rules to determine current multi-state status of the node, wherein states of the multi-state status includes a good state, a bad state, and at least one degraded state, wherein the good state requires that both an application and an operating system report an up status and that no severe or critical chassis codes are received from the computer system, wherein the bad state requires that either an application or an operating system report a down status, or a critical chassis code is received from the computer system, and wherein a degraded state requires that either the computer system loses greater than a predetermined percentage of performance, or a severe chassis code is received from the computer system.

2. The method of claim 1, further comprising:

writing the multi-state status of the node to a first register.

3. The method of claim 2, further comprising:

driving the multi-state status from the first register to a next node via a point-to-point communications path.

4. The method of claim 3, further comprising:

receiving multi-state status from another node; and writing the multi-state status from the other node to a second register.

5. The method of claim 4 further comprising:

reading the statuses from the first and second registers; and taking action to maintain high availability of the cluster based on the statuses read.

6. The method of claim 4, wherein the multi-state status from the other node includes multiple levels of degradation.

7. The method of claim 3 wherein the status writable into the second register includes a no signal state.

8. The method of claim 1 wherein the multi-state status of the node includes multiple levels of degradation.

9. The method of claim 1 wherein the set of rules includes a rule such that receipt of a chassis code of a critical level results in the bad state and another rule such that receipt of a chassis code of a level below critical results in a degraded state.

* * * * *

UNITED STATES PATENT AND TRADEMARK OFFICE
CERTIFICATE OF CORRECTION

| | |
|---|---|
| PATENT NO. | : 7,228,460 B2 |
| APPLICATION NO. | : 10/764198 |
| DATED | : June 5, 2007 |
| INVENTOR(S) | : Ken Gary Pomaranski et al. |

Page 1 of 1

It is certified that error appears in the above-identified patent and that said Letters Patent is hereby corrected as shown below:

In column 8, line 20, in Claim 5, after "claim 4" insert -- , --.

In column 8, line 27, in Claim 7, after "claim 3" insert -- , --.

In column 8, line 30, in Claim 8, after "claim 1" insert -- , --.

In column 8, line 32, in Claim 9, after "claim 1" insert -- , --.

Signed and Sealed this

Fifth Day of August, 2008

JON W. DUDAS
*Director of the United States Patent and Trademark Office*